(12) United States Patent
Kameda et al.

(10) Patent No.: US 7,723,442 B2
(45) Date of Patent: May 25, 2010

(54) ROOM TEMPERATURE CURABLE ORGANOPOLYSILOXANE COMPOSITION

(75) Inventors: Norio Kameda, Annaka (JP); Hideyoshi Yanagisawa, Annaka (JP); Tsuneo Kimura, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 866 days.

(21) Appl. No.: 11/387,965

(22) Filed: Mar. 24, 2006

(65) Prior Publication Data

US 2006/0217498 A1 Sep. 28, 2006

(30) Foreign Application Priority Data

Mar. 25, 2005 (JP) ............... 2005-089237

(51) Int. Cl.
*C08L 77/04* (2006.01)
(52) U.S. Cl. .................. 525/477; 528/34; 528/38
(58) Field of Classification Search ........... None
See application file for complete search history.

(56) References Cited

U.S. PATENT DOCUMENTS

| | | | |
|---|---|---|---|
| 4,629,775 A | 12/1986 | Arai et al. | |
| 4,659,798 A * | 4/1987 | Pohl et al. | 528/33 |
| 5,286,766 A * | 2/1994 | Arai et al. | 523/213 |
| 6,573,356 B2 | 6/2003 | Araki et al. | |
| 6,809,136 B2 | 10/2004 | Sakamoto et al. | |
| 6,878,452 B2 | 4/2005 | Kameda et al. | |

2002/0091220 A1 7/2002 Kimura

FOREIGN PATENT DOCUMENTS

| | | | |
|---|---|---|---|
| CA | 1238997 | * | 7/1988 |
| EP | 0 206 301 A2 | | 12/1986 |
| JP | 61-64753 | | 4/1986 |

* cited by examiner

*Primary Examiner*—Marc S Zimmer
(74) *Attorney, Agent, or Firm*—Oblon, Spivak, McClelland, Maier & Neustadt, L.L.P.

(57) ABSTRACT

Provided is a room temperature curable organopolysiloxane composition, including (A) 100 parts by mass of a diorganopolysiloxane with both terminals blocked with silanol groups, or a diorganopolysiloxane with each terminal blocked, independently, with a trialkoxysilyl group or a dialkoxyorganosilyl group, or a mixture thereof, (B) 0.1 to 30 parts by mass of a silane compound and/or a partial hydrolysis-condensation product thereof containing an average of at least two hydrolysable groups bonded to silicon atoms within each molecule, and in which the remaining groups bonded to silicon atoms are methyl groups, ethyl groups, propyl groups, vinyl groups, or phenyl groups, and (C) 0.1 to 10 parts by mass of either one, or two or more organosilicon compounds containing amino groups, and also containing four or more hydrolysable groups. Also provided are a sealing material and an adhesive including the above composition. Further provided are a process for sealing an adherend with a cured product of the above sealing material and a process for bonding two adherends with a cured product of the above adhesive. The room temperature curable organopolysiloxane composition yields a cured product that exhibits excellent adhesion when exposed to hot water vapor and following such exposure, and suffers minimal evaporation residues derived from the cured product.

8 Claims, No Drawings

ROOM TEMPERATURE CURABLE ORGANOPOLYSILOXANE COMPOSITION

BACKGROUND OF THE INVENTION

1. Field of the Invention

The present invention relates to a room temperature curable organopolysiloxane composition, which yields a cured product that exhibits excellent adhesion when exposed to hot water vapor and following such exposure, exhibits minimal impurities (evaporation residues) within a solution obtained by extracting the cured product with water, and can be used as a sealing material for construction purposes or as an adhesive for bonding or securing components for electrical or electronic products.

2. Description of the Prior Art

RTV (room temperature vulcanizing) silicone rubber compositions that undergo cross-linking in the presence of moisture are not only easy to handle, but also exhibit excellent heat resistance, adhesion, and electrical characteristics, and are consequently used in a wide variety of fields as sealing materials for construction purposes and as adhesives within the electrical and electronic fields. In the case of sealing applications for components for electrical or electronic products, and particularly for the sealing of window frames in microwave ovens, silicone rubber compositions that undergo cross-linking in the presence of moisture are widely used because of their superior heat resistance and adhesion. In this application, the silicone rubber obtained by curing the composition must not only exhibit excellent initial adhesion to the glass and coated steel plate that function as adhesion targets, together with excellent heat resistant adhesion and excellent adhesion when exposed to hot water vapor, but also need to be safe from a food hygiene viewpoint. For example, in Japan, such a silicone rubber must pass a Japanese Food Hygiene Law test (Official Notification No. 85, Ministry of Health, Labor, and Welfare of Japan).

In order to impart adhesiveness to a RTV silicone rubber, the addition of a silicon compound-based silane coupling agent is effective, but although RTV silicone rubbers comprising conventionally used silane coupling agents such as aminopropyltriethoxysilane exhibit excellent levels of initial adhesion and heat resistant adhesion, they have been ineffective in improving the adhesion upon exposure to hot water vapor. For example, the patent reference 1 and patent reference 2 propose RTV silicone rubber compositions that use the reaction product of a mercaptosilane and an isocyanate compound or polyisocyanate compound as an adhesion assistant, and although the silicone rubbers obtained from these compositions exhibit excellent initial adhesion, the adhesion upon exposure to hot water vapor is inadequate.

Furthermore, the patent reference 3 proposes the use of a poly(alkoxysilylalkyl)amine as the cross-linking agent for a RTV silicone rubber composition, but the adhesion upon exposure to hot water vapor and the degree of reduction in the level of evaporation residues are inadequate.

In order to resolve the problems described above, the inventors of the present invention have already proposed a RTV silicone rubber composition that comprises a specific silane coupling agent (see patent reference 4). Compared with conventional RTV silicone rubber compositions, this RTV silicone rubber composition provides a dramatic improvement in the adhesion following exposure to hot water vapor. However, in the elution tests prescribed in the Official Notification No. 85 from the Ministry of Health, Labor, and Welfare of Japan, and particularly in the test relating to evaporation residues, the composition narrowly failed to reach the specified criteria.

[Patent Reference 1] U.S. Pat. No. 4,629,775
[Patent Reference 2] JP 61-64753A
[Patent Reference 3] EP 0 206 301 A2
[Patent Reference 4] US 2002/0091220 A1

SUMMARY OF THE INVENTION

Accordingly, an object of the present invention is to provide a room temperature curable organopolysiloxane composition that yields a cured product that exhibits excellent adhesion when exposed to hot water vapor and following such exposure, and suffers minimal evaporation residues derived from the cured product.

As a result of intensive investigation aimed at achieving the above object, the inventors of the present invention discovered that by blending a specific silane compound represented by a general formula (3) shown below with a room temperature curable organopolysiloxane composition, a cured product could be obtained that retained favorable adhesion even upon exposure to hot water vapor and following such exposure, and the level of evaporation residues derived from the cured product could also be reduced, and they were hence able to complete the present invention.

In other words, the present invention provides a room temperature curable organopolysiloxane composition, comprising:

(A) 100 parts by mass of an organopolysiloxane represented by a general formula (1) shown below:

$$\text{HO}(\text{SiR}^1_2\text{O})_n\text{H} \tag{1}$$

(wherein, each $R^1$ represents, independently, an unsubstituted or substituted monovalent hydrocarbon group of 1 to 10 carbon atoms, and n represents an integer of 10 or greater), or an organopolysiloxane represented by a general formula (2) shown below:

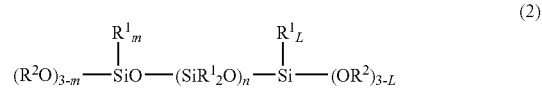

(wherein, $R^1$ and n are as defined above, each $R^2$ represents, independently, an unsubstituted or substituted monovalent hydrocarbon group of 1 to 6 carbon atoms, and m and L each represent an integer of 0 or 1), or a mixture thereof, (B) 0.1 to 30 parts by mass of a silane compound and/or a partial hydrolysis-condensation product thereof containing an average of at least two hydrolysable groups bonded to silicon atoms within each molecule, and in which the remaining groups bonded to silicon atoms are selected from the group consisting of a methyl group, ethyl group, propyl group, vinyl group, and phenyl group, and (C) 0.1 to 10 parts by mass of either one, or two or more organosilicon compounds represented by a general formula (3) shown below:

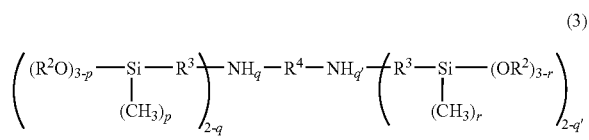

(wherein, $R^2$ is as defined above, each $R^3$ represents, independently, a bivalent hydrocarbon group of 1 to 10 carbon atoms, $R^4$ represents a bivalent hydrocarbon group of 1 to 10 carbon atoms, p, q, and r each represent an integer of 0 or 1, q' represents an integer of 2 or less, and q+q' represents an integer of 2 or less).

Furthermore, the present invention also provides a sealing material and an adhesive comprising the above composition.

The present invention also provides a process for sealing an adherend with a cured product of the above sealing material, comprising the steps of:

applying said sealing material to said adherend and
curing said sealing material to form said cured product on said adherend.

The present invention also provides a process for bonding two adherends with a cured product of the above adhesive, comprising the steps of:

sandwiching said adhesive between said adherends, and
curing said adhesive to form said cured product between said adherends.

By using a room temperature curable organopolysiloxane of the present invention, a silicone rubber can be obtained that exhibits excellent adhesion upon exposure to hot water vapor and following such exposure. This silicone rubber is particularly useful as a sealing material used around water, and as an adhesive for bonding and securing components within electrical and electronic products that are exposed to water vapor.

DETAILED DESCRIPTION OF THE PREFERRED EMBODIMENTS

As follows is a more detailed description of the present invention.

[Component (A)]

The component (A) is an organopolysiloxane represented by the general formula (1) shown below:

(wherein, each $R^1$ represents, independently, an unsubstituted or substituted monovalent hydrocarbon group of 1 to 10 carbon atoms, and n represents an integer of 10 or greater), or an organopolysiloxane represented by the general formula (2) shown below:

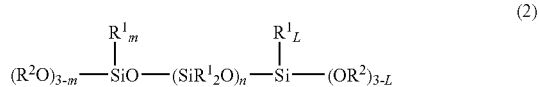

(wherein, $R^1$ and n are as defined above, each $R^2$ represents, independently, an unsubstituted or substituted monovalent hydrocarbon group of 1 to 6 carbon atoms, and m and L each represent an integer of 0 or 1), or a mixture of the two.

In the above general formulas (1) and (2), each $R^1$ represents, independently, an unsubstituted or substituted monovalent hydrocarbon group of 1 to 10 carbon atoms, and suitable examples include alkyl groups such as a methyl group, ethyl group, or propyl group; cycloalkyl groups such as a cyclohexyl group; alkenyl groups such as a vinyl group or allyl group; aryl groups such as a phenyl group or tolyl group; and groups in which a portion of, or all of, the hydrogen atoms within these groups have been substituted with a halogen atom or the like, such as a 3,3,3-trifluoropropyl group. Of these, a methyl group, vinyl group, phenyl group, or 3,3,3-trifluoropropyl group is preferred, and a methyl group is particularly desirable. A plurality of these $R^1$ groups exist in the general formulas (1) and (2), and these groups may be either the same or different.

In the general formula (1), n is an integer of 10 or greater, and is preferably an integer that results in a viscosity at 25° C. for the organopolysiloxane represented by the general formula (1) that falls within a range from 25 to 500,000 mm²/sec., and even more preferably from 500 to 100,000 mm²/sec.

In the general formula (2), each $R^2$ represents, independently, an unsubstituted or substituted monovalent hydrocarbon group of 1 to 6 carbon atoms, and suitable examples include alkyl groups such as a methyl group, ethyl group, or propyl group; cycloalkyl groups such as a cyclohexyl group; alkenyl groups such as a vinyl group, allyl group, or propenyl group; a phenyl group; and alkoxyalkyl groups; and of these, a methyl group or ethyl group is preferred, and a methyl group is particularly desirable.

In the general formula (2), m and L each represent an integer of 0 or 1.

Each of the organopolysiloxanes represented by the aforementioned general formulas (1) and (2) may be used either alone, or in a combination of two or more different compounds.

[Component (B)]

The component (B) is a silane compound and/or a partial hydrolysis-condensation product thereof containing an average of at least two hydrolysable groups bonded to silicon atoms within each molecule, and in which the remaining groups bonded to silicon atoms are selected from the group consisting of a methyl group, ethyl group, propyl group, vinyl group, and phenyl group. This silane compound can be represented by the formula $R^5_{4-a}SiX_a$ (wherein, $R^5$ represents a group selected from the group consisting of a methyl group, ethyl group, propyl group, vinyl group, and phenyl group, X represents a hydrolysable group, and a represents an integer of 2 or 3). The component (B) may be used either alone, or in a combination of two or more different compounds.

Examples of the hydrolysable groups within the component (B) include ketoxime groups, alkoxy groups, acetoxy groups, and isopropenoxy groups, and of these, ketoxime groups, alkoxy groups, and isopropenoxy groups are preferred.

Specific examples of the component (B) include ketoxime silanes such as methyltris(dimethylketoxime)silane, methyltris(methylethylketoxime)silane, ethyltris(methylethylketoxime)silane, methyltris(methylisobutylketoxime)silane, vinyltris(methylethylketoxime)silane, and phenyltris(methylethylketoxime)silane; alkoxy silanes such as methyltrimethoxysilane, dimethyldimethoxysilane, vinyltrimethoxysilane, phenyltrimethoxysilane, and methyltriethoxysilane; isopropenoxy silanes such as methyltriisopropenoxysilane, ethyltriisopropenoxysilane, and vinyltriisopropenoxysilane; acetoxy silanes such as methyltriacetoxysilane, ethyltriacetoxysilane, and vinyltriacetoxysilane; and partial hydrolysis-condensation products of these silanes.

The blend quantity of the component (B) is typically within a range from 0.1 to 30 parts by mass, preferably from 0.5 to 20 parts by mass, and even more preferably from 1 to 15 parts by mass, per 100 parts by mass of the component (A). If the blend quantity is less than 0.1 parts by mass, then it becomes difficult to achieve sufficient cross-linking when the resulting composition is cured, meaning obtaining a cured product with the targeted level of rubber elasticity becomes difficult. In contrast, if the blend quantity exceeds 30 parts by mass, then the mechanical characteristics of the obtained cured product are prone to deterioration.

[Component (C)]

The organosilicon compound of the component (C) has an important function in improving the adhesion of the cured product of the composition of the present invention when exposed to hot water vapor and following such exposure, and is a component that causes no increase in the level of evaporation residues from the cured product.

The component (C) is either one, or two or more organosilicon compounds represented by the general formula (3) shown below:

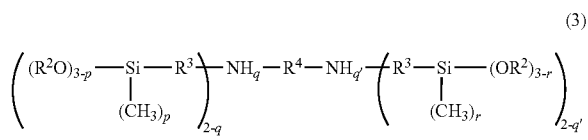

(wherein, $R^2$ is as defined above, each $R^3$ represents, independently, a bivalent hydrocarbon group of 1 to 10 carbon atoms, $R^4$ represents a bivalent hydrocarbon group of 1 to 10 carbon atoms, p, q, and r each represent an integer of 0 or 1, q' represents an integer of 2 or less, and q+q' represents an integer of 2 or less). As is evident from the above general formula (3), the organosilicon compound of the component (C) contains amino groups, and also contains four or more hydrolysable groups.

In the general formula (3), $R^2$ is as defined above, but is preferably a methyl group or ethyl group.

In the general formula (3), each $R^3$ represents, independently, a bivalent hydrocarbon group of 1 to 10 carbon atoms, and suitable examples include alkylene groups such as a methylene group, ethylene group, propylene group, tetramethylene group, hexamethylene group, octamethylene group, decamethylene group, or 2-methylpropylene group; bivalent hydrocarbon groups of 6 to 10 carbon atoms that contain an aromatic ring, including arylene groups such as a phenylene group; and groups in which an aforementioned arylene group is bonded to an aforementioned alkylene group, such as groups represented by the formula: —$(CH_2)_s$—$C_6H_4$—$(CH_2)_t$— (wherein, s and t each represent an integer from 0 to 4, and $0<s+t\leqq 4$), although of these, a methylene group, ethylene group, or propylene group or the like is preferred, and a propylene group is particularly desirable.

In the above general formula (3), $R^4$ represents a bivalent hydrocarbon group of 1 to 10 carbon atoms, and suitable examples include the same bivalent groups as those listed above in relation to $R^3$, although of these, a methylene group, ethylene group, or propylene group or the like is preferred, and an ethylene group is particularly desirable.

Specific examples of the component (C) include the compounds shown below.

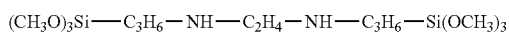

-continued

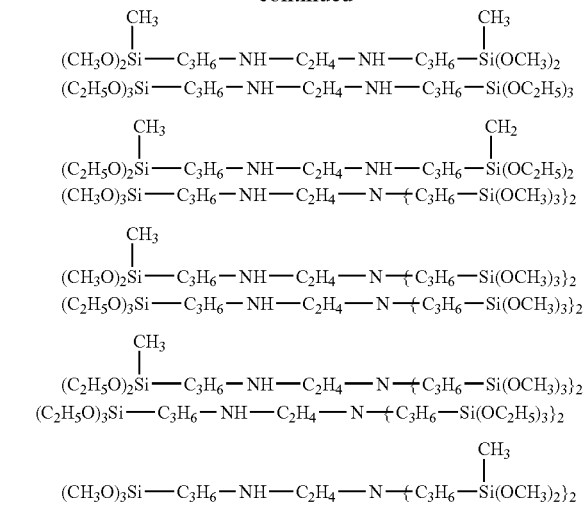

The blend quantity of the component (C) is typically within a range from 0.1 to 10 parts by mass, and preferably from 0.5 to 6 parts by mass, per 100 parts by mass of the component (A). If this blend quantity is less than 0.1 parts by mass, then the adhesion of the cured product when exposed to hot water vapor and following such exposure tends to lack sufficient strength. If the blend quantity exceeds 10 parts by mass, then the handling and workability characteristics of the obtained cured product tend to be prone to deterioration.

[Other Components]

In addition to the components described above, if required, typically known fillers and catalysts and the like may also be added to a composition of the present invention as other components, provided such addition does not impair the object of the present invention.

Examples of suitable fillers include ground silica, fumed silica, wet silica, carbon-based powders such as acetylene black, calcium carbonate, zinc carbonate, basic zinc carbonate, zinc oxide, and magnesium oxide. The blend quantity of these fillers is preferably within a range from 0 to 500 parts by mass, even more preferably from 2 to 200 parts by mass, and most preferably from 3 to 100 parts by mass, per 100 parts by mass of the component (A).

Examples of suitable catalysts include conventional condensation reaction catalysts such as organotin ester compounds, organotin chelate compounds, alkoxytitanium compounds, titanium chelate compounds, and silicon compounds that contain a guanidyl group. The blend quantity of these catalysts need only be an effective catalytic quantity, and is preferably no more than 10 parts by mass, even more preferably within a range from 0.001 to 10 parts by mass, and most preferably from 0.01 to 5 parts by mass, per 100 parts by mass of the component (A).

Furthermore, additives including thixotropic improvement agents such as polyethers, pigments, moldproofing agents, and antibacterial agents may also be added, as required, to improve a variety of different characteristics.

[Method of Producing Composition]

A composition of the present invention can be produced by kneading together the aforementioned components (A) through (C), preferably in a waterless state, using a conventionally used kneading device such as a Shinagawa mixer, a planetary mixer, or a flow jet mixer.

[Cured Product]

A composition of the present invention can be applied to a predetermined substrate in accordance with the intended application, and then cured at room temperature. Furthermore, a composition of the present invention can also be cured by heating if required.

[Composition Applications]

A composition of the present invention can be used, in particular, as a sealing material used around water, and as an adhesive for bonding and securing components within electrical and electronic products that are exposed to water vapor. Examples of suitable target adherends to which a sealing material or adhesive comprising a composition of the present invention can be applied include glass, coated steel plate, metals such as aluminum and iron, and resins.

EXAMPLES

As follows is a description of specifics of the present invention, using a series of examples and comparative examples, although the present invention is in no way limited by these examples.

Example 1

10 parts by mass of a fumed silica that had undergone surface treatment with dimethyldichlorosilane was added to 90 parts by mass of a dimethylpolysiloxane with both terminals blocked with trimethoxysilyl groups and with a viscosity at 25° C. of 900 mm$^2$/sec., and the resulting combination was mixed together using a mixer, thus yielding a mixture. To this mixture were added 2 parts by mass of vinyltrimethoxysilane and 0.1 parts by mass of dioctyltin dilaurate, and the mixture was then mixed thoroughly under reduced pressure, yielding another mixture. To this mixture was added 2.0 parts by mass of a silane compound represented by a formula shown below:

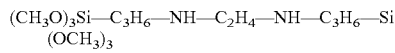

and the resulting mixture was then mixed thoroughly under reduced pressure, yielding a composition 1.

Example 2

10 parts by mass of acetylene black was added to 90 parts by mass of a dimethylpolysiloxane with both terminals blocked with silanol groups and with a viscosity at 25° C. of 700 mm$^2$/sec., and the resulting combination was mixed together using a mixer, thus yielding a mixture. To this mixture were added 6 parts by mass of methyltributanoximesilane and 0.1 parts by mass of dioctyltin dioctanoate, and the mixture was then mixed thoroughly under reduced pressure, yielding another mixture. To this mixture was added 2.0 parts by mass of the silane compound represented by the formula shown below:

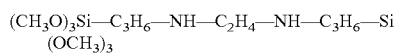

and the resulting mixture was then mixed thoroughly under reduced pressure, yielding a composition 2.

Example 3

10 parts by mass of acetylene black was added to 90 parts by mass of a dimethylpolysiloxane with both terminals blocked with silanol groups and with a viscosity at 25° C. of 700 mm$^2$/sec., and the resulting combination was mixed together using a mixer, thus yielding a mixture. To this mixture were added 6 parts by mass of vinyltriisopropenoxysilane and 0.5 parts by mass of tetramethylguanidylpropyltrimethoxysilane, and the mixture was then mixed thoroughly under reduced pressure, yielding another mixture. To this mixture was added 2.0 parts by mass of the silane compound represented by the formula shown below:

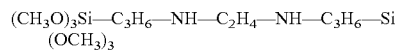

and the resulting mixture was then mixed thoroughly under reduced pressure, yielding a composition 3.

Example 4

With the exception of replacing the 2.0 parts by mass of the silane compound represented by the formula shown in the example 3 with 2.0 parts by mass of a silane compound represented by a formula shown below:

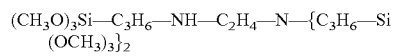

a composition 4 was prepared in the same manner as the example 3.

Comparative Example 1

With the exception of not using the 2.0 parts by mass of the silane compound represented by the formula shown in the example 3, a composition 5 was prepared in the same manner as the example 3.

Comparative Example 2

With the exception of replacing the 2.0 parts by mass of the silane compound represented by the formula shown in the example 3 with 2.0 parts by mass of a silane compound represented by a formula shown below:

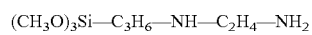

a composition 6 was prepared in the same manner as the example 3.

Comparative Example 3

With the exception of replacing the 2.0 parts by mass of the silane compound represented by the formula shown in the example 3 with 2.0 parts by mass of a silane compound represented by a formula shown below:

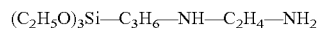

a composition 7 was prepared in the same manner as the example 3.

Comparative Example 4

With the exception of replacing the 2.0 parts by mass of the silane compound represented by the formula shown in the example 3 with 2.0 parts by mass of a silane compound represented by a formula shown below:

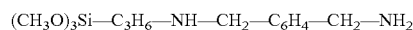

a composition 8 was prepared in the same manner as the example 3.

[Evaluations]

Initial Adhesion, Adhesion Immediately after Degradation, Adhesion after Degradation Glass substrates were prepared as target adherends, and the surface of each substrate was wiped with toluene. Each of the above compositions 1 through 8 was applied to a substrate surface, forming a coating with a width of 10 mm and a thickness of 1 mm, and the coating was then cured for 72 hours at 23° C. and 50% RH, thus forming a test specimen comprising the glass substrate and a silicone rubber. A cut was made within a portion of the silicone rubber using a cutter, and a peel testing apparatus was then used to peel the silicone rubber in a perpendicular direction away from the glass substrate, thereby determining the initial adhesion of the rubber.

Subsequently, a test specimen was exposed to saturated water vapor (100° C.) for 15 minutes, and immediately following removal of the moisture by wiping, the silicone rubber was peeled from the glass substrate, thereby determining the adhesion immediately after degradation. Moreover, a test specimen was allowed to stand for 10 minutes at 23° C. and 50% RH, and the silicone rubber was then peeled from the glass substrate, thereby determining the adhesion after degradation. The results are shown in Table 1.

The adhesion was determined by inspecting the state of the interface between the glass substrate and the peeled silicone rubber. If the silicone rubber had undergone cohesive failure, then the adhesion was evaluated as favorable, and was recorded as "adhered" in Table 1. If interfacial peeling had occurred between the glass substrate and the silicone rubber, then the adhesion was evaluated as poor, and was recorded as "peeled" in Table 1.

Evaporation Residues

Measurement was conducted in accordance with the Japanese Food Hygiene Law test (Official Notification No. 85, Ministry of Health, Labor, and Welfare of Japan). Specifically, a cured product was subjected to elution with 2 ml of water per 1 cm² of a cured product over 30 minutes at 60° C. The solution obtained by the elution was used as a test solution to evaluate the weight of an evaporation residue. An evaporating dish made of platinum or quartz was dried at 105° C. and weighed beforehand. 200 to 300 ml of the test solution was placed on the evaporating dish and evaporated to dryness on a water bath. The evaporation residue was dried at 105° C. for 2 hours and then cooled in a desiccator. The weight of the evaporating dish with the evaporation residue was measured. The difference A (mg) between the weight of the evaporating dish with the evaporation residue and the weight of the evaporation dish measured beforehand was calculated. The weight of the evaporation residue was calculated with the following formula:

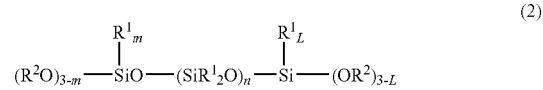

Weight of the evaporation residue (ppm)=(A−B)× 1000/quantity of the test solution used (ml), wherein B (mg) is the difference between the weight of the evaporating dish with the evaporation residue and the weight of the evaporation dish measured beforehand when the same volume of water is used instead of the test solution. The criterion specified by the Official Notification No. 85 from the Ministry of Health, Labor, and Welfare of Japan is a value of 60 ppm or less. The results are shown in Table 1.

TABLE 1

| | Composition | | | | | | | |
|---|---|---|---|---|---|---|---|---|
| | 1 | 2 | 3 | 4 | 5 | 6 | 7 | 8 |
| | Example or Comparative example | | | | | | | |
| | Examples | | | | Comparative examples | | | |
| | 1 | 2 | 3 | 4 | 1 | 2 | 3 | 4 |
| Initial adhesion | adhered | adhered | adhered | adhered | peeled | adhered | adhered | adhered |
| Adhesion immediately after degradation | adhered | adhered | adhered | adhered | peeled | peeled | peeled | peeled |
| Adhesion after degradation | adhered | adhered | adhered | adhered | peeled | peeled | peeled | peeled |
| Evaporation residues (ppm) | 30 or less | 30 or less | 30 or less | 30 or less | 30 or less | 55 | 55 | 55 |

What is claimed is:

1. A room temperature curable organopolysiloxane composition, comprising:

(A) 100 parts by mass of an organopolysiloxane represented by formula (2)

$$(R^2O)_{3-m}-\underset{\underset{R^1_m}{|}}{Si}O-(SiR^1{}_2O)_n-\underset{\underset{R^1_L}{|}}{Si}-(OR^2)_{3-L} \quad (2)$$

wherein each $R^1$ represents, independently, an unsubstituted or substituted monovalent hydrocarbon group of 1 to 10 carbon atoms; each $R^2$ represents, independently, an unsubstituted or substituted monovalent hydrocarbon group of 1 to 6 carbon atoms; n represents an integer of 10 or greater; and m and L each represent an integer of 0 or 1;

(B) 0.1 to 30 parts by mass of a silane compound and/or a partial hydrolysis-condensation product thereof containing an average of at least two hydrolysable groups selected from the group consisting of ketoxime groups, alkoxy groups and isopropenoxy groups bonded to silicon atoms within each molecule, and in which remaining groups bonded to silicon atoms are selected from the group consisting of a methyl group, ethyl group, propyl group, vinyl group, and phenyl group; and (C) 0.1 to 10 parts by mass of either one, or two or more organosilicon compounds represented by formula (3)

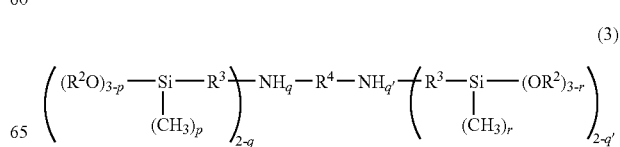

wherein $R^2$ is as defined above; each $R^3$ represents, independently, a bivalent hydrocarbon group of 1 to 10 carbon atoms; $R^4$ represents a bivalent hydrocarbon group of 1 to 10 carbon atoms; p, q, and r each represent an integer of 0 or 1; q' represents an integer of 2 or less; and q+q' represents an integer of 2 or less.

2. The composition according to claim 1, wherein in said formula (3), $R^2$ represents a methyl group or ethyl group; $R^3$ represents a methylene group, ethylene group, or propylene group; and $R^4$ represents a methylene group, ethylene group, or propylene group.

3. The composition according to claim 1, wherein in said formula (3), $R^2$ represents a methyl group or ethyl group; $R^3$ represents a propylene group; and $R^4$ represents an ethylene group.

4. The composition according to claim 1, wherein said component (C) is a silane compound represented by $(CH_3O)_3Si-C_3H_6-NH-C_2H_4-NH-C_3H_6-Si(OCH_3)_3$; a silane compound represented by $(CH_3O)_3Si-C_3H_6-NH-C_2H_4-N-\{C_3H_6-Si(OCH_3)_3\}_2$; or a combination thereof.

5. A sealing material comprising the composition defined in claim 1.

6. An adhesive comprising the composition defined in claim 1.

7. A process for sealing an adherend with a cured product of the sealing material defined in claim 5, comprising:
applying said sealing material to said adherend; and
curing said sealing material to form said cured product on said adherend.

8. A process for bonding two adherends with a cured product of the adhesive defined in claim 6, comprising:
sandwiching said adhesive between said adherends; and
curing said adhesive to form said cured product between said adherends.

* * * * *